(12) United States Patent
Xu et al.

(10) Patent No.: US 7,501,462 B2
(45) Date of Patent: Mar. 10, 2009

(54) POLYOLEFIN COMPOSITION

(75) Inventors: Jiannong Xu, Spartanburg, SC (US);
Xiaodong Edward Zhao, Moore, SC (US); Jiang Li, Spartanburg, SC (US); Kemper David Lake, Jr., Spartanburg, SC (US)

(73) Assignee: Milliken & Company, Spartanurg, SC (US)

( * ) Notice: Subject to any disclaimer, the term of this patent is extended or adjusted under 35 U.S.C. 154(b) by 0 days.

(21) Appl. No.: 12/072,898

(22) Filed: Feb. 28, 2008

(65) Prior Publication Data
US 2008/0153949 A1   Jun. 26, 2008

Related U.S. Application Data

(63) Continuation of application No. 11/135,786, filed on May 24, 2005, now Pat. No. 7,351,758.

(51) Int. Cl.
*C08K 5/15* (2006.01)
*C07D 323/04* (2006.01)

(52) U.S. Cl. ............... 524/108; 524/583; 549/364
(58) Field of Classification Search ......... 524/108, 524/583; 549/364
See application file for complete search history.

(56) References Cited

U.S. PATENT DOCUMENTS

| 3,721,682 | A |   | 3/1973  | Murai et al. |
| 4,016,118 | A | * | 4/1977  | Hamada et al. ............. 524/108 |
| 4,429,140 | A |   | 1/1984  | Murai et al. |
| 4,562,265 | A |   | 12/1985 | Machell |
| 4,902,807 | A |   | 2/1990  | Kobayashi et al. |
| 5,049,605 | A | * | 9/1991  | Rekers ....................... 524/108 |
| 5,731,474 | A |   | 3/1998  | Scrivens et al. |
| 6,245,843 | B1 |  | 6/2001  | Kobayashi et al. |
| 6,586,007 | B2 |  | 7/2003  | Lake, Jr. et al. |
| 6,593,427 | B2 | * | 7/2003 | Kobayashi et al. .......... 525/194 |
| 7,351,758 | B2 | * | 4/2008 | Xu et al. .................... 524/108 |

FOREIGN PATENT DOCUMENTS

JP    7278362 A    10/1995

OTHER PUBLICATIONS

ASTM International—Designation: D 1238-04. Standard Test Method for Melt Flow Rates of Thermoplastics by Extrusion Plastometer1, Published Apr. 2004.
ASTM International—Designation: D 1003-00. Standard Test Method for Haze and Luminous Transmittance of Transparent Plastics1, Published Jul. 2000.
Special Chem Innovation & Solutions Through Polymer Additives and Colors. Peroxides in polypropylene. Apr. 8, 2005.

* cited by examiner

*Primary Examiner*—Fred M Teskin
(74) *Attorney, Agent, or Firm*—Robert M. Lanning

(57) ABSTRACT

Clarified polyolefins such as polypropylene are used widely to make polymer articles, containers, and the like. Such articles may be manufactured by the injection of molten polymer into a mold or forming device in manufacturing processes at high rates. A clarified composition is provided to achieve optimized clarity and organoleptic performance at lower processing temperatures and/or within a polypropylene resin having a higher melt flow rate.

15 Claims, 1 Drawing Sheet

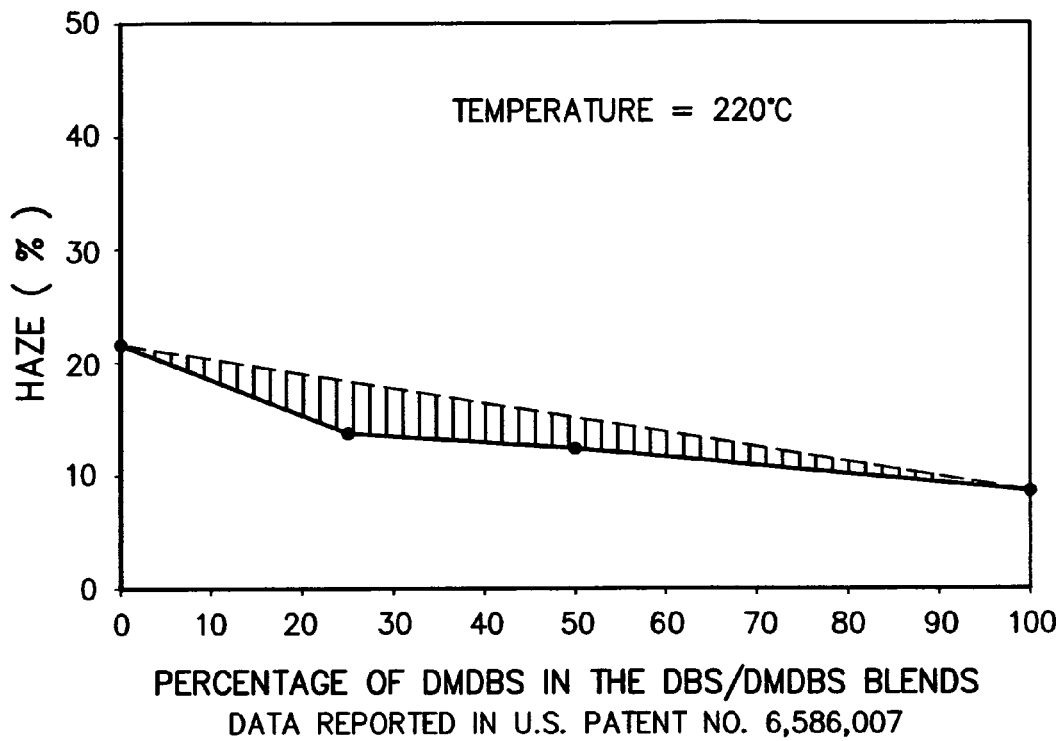
Figure -1-
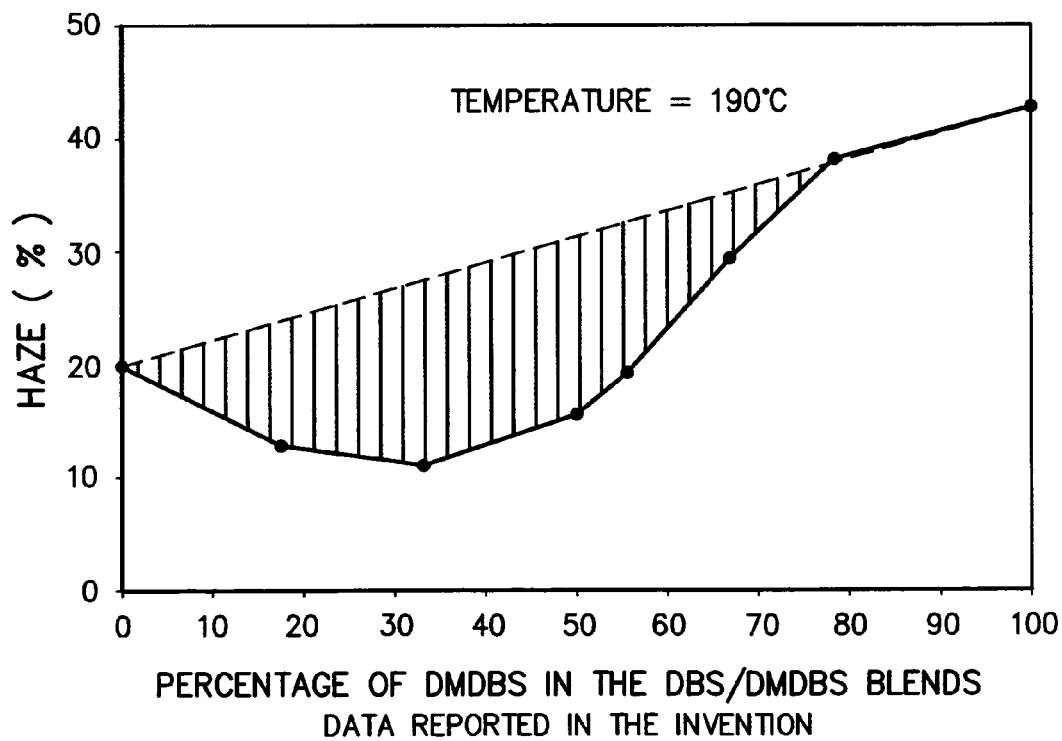
Figure -2-

POLYOLEFIN COMPOSITION

CROSS-REFERENCE TO RELATED PATENT APPLICATIONS

This application is a continuation of U.S. patent application Ser. No. 11/135,788, filed on May 24, 2005, now U.S. Pat. No. 7,351,758, issued on Apr. 1, 2008.

FIELD OF THE INVENTION

This invention relates to a process for producing high clarity polyolefins using nucleating agents which are derivatives of dibenzylidene sorbitol ("DBS").

BACKGROUND

As polyolefin articles are fabricated in melt processing, the polymer crystallizes. Crystals tends to organize into clusters. DBS-based compounds enhance nucleation and clarification of polyolefins by providing a fibrous network in the polymer. DBS derivatives provide a fibrous network that serves as a template for polyolefin recrystallization that results in faster and more orderly crystal growth during the polymer cooling process.

DBS derivative compounds are usually prepared by condensation of two moles of an aromatic aldehyde with one mole of a polyhydric alcohol such as sorbitol or xylitol. Examples of this process can be found in Murai et al., U.S. Pat. No. 3,721,682; Murai et al., U.S. Pat. No. 4,429,140; Machell, U.S. Pat. No. 4,562,265; Kobayashi et al., U.S. Pat. No. 4,902,807; and Scrivens et al., U.S. Pat. No. 5,731,474. DBS and its derivative compound bis-(3,4-dimethyl benzylidene) sorbitol (3,4-DMDBS, or simply "DMDBS") and polyolefin articles containing these compounds also have been disclosed in U.S. Pat. Nos. 6,586,007 and 5,049,605. These compounds are known as additives that impart relatively low haze.

Haze is a measurement of the amount of transmitted light that is scattered as the light passes through an article. Haze is expressed as a percentage (ASTM Method D1003-00). The greater the haze of an injection molded polypropylene article, the more opaque the article appears. Low haze is highly desirable not only from an aesthetic perspective, but also in many applications from a utilitarian perspective. For example, in consumer applications, it is desirable to clearly see the contents of a food storage container without having to remove the lid. It may be crucial to clearly see the volume in a syringe being used for delivery of medications, in medical plastics applications. Thus, low haze is very desirable for many applications.

Typical haze values for articles containing the above referenced individual compounds are roughly 8% for 3,4-DMDBS and about 20% for unsubstitiuted DBS (called simply "DBS"). These quoted haze values were taken in random polypropylene copolymers (RCP) when injection molded at about 230° C. in 50 mil plaques containing about 2000 ppm of total clarifier loading.

Melt flow index (MFI), also known as melt flow rate (MFR), is a measure of viscosity of a material (such as a polyolefin resin) at a given temperature, expressed as grams/10 minutes. ASTM 1238-04 is an Internationally known standard for determining the rate of extrusion of molten resins through a die of specified length and diameter under prescribed conditions. ASTM D1238-04 (Procedure C) is directed to automatically timed flow rate measurements for high flow rate polyolefins using half height, half diameter dies. In general, the lower the viscosity of a material at a given temperature, the higher will be the MFR of that material.

There is a continuing demand in the industry for improved polyolefin processes and products. In manufacturing of such articles, cost of manufacture is greatly influenced by cycle time. That is, cycle time is the time interval for a complete molding cycle, i.e. the time required to close the mold, inject liquid plastic, mold the part, and eject the part. Typically, cycle time may be influenced negatively when a higher processing temperature is required, which results in prolonged cooling time. Furthermore, the cost in energy consumption would be higher using higher processing temperatures. Thus, short cycle times and lower processing temperatures are desirable. However, the limits required in terms of cycle time and processing temperature are dictated by the resin, the processing conditions, and the behavior of the nucleating agent(s) in the resin. These factors may be very unpredictable.

In the use of DBS derivatives, it is known that bis(3,4-dimethylbenzylidene) sorbitol (known commercially as Millad® 3988, or "DMDBS"; sold by Milliken & Company) is an excellent nucleating agent, and is capable of contributing to relatively low haze levels in polyolefins. It is also known, however, that this compound at very low processing temperatures may exhibit undesirably high levels of haze.

U.S. Pat. No. 6,586,007 to Lake et al (assigned to Milliken & Company, a common assignee to the present application) discloses in Table 1, comparative examples 16 and 17 the use of a blend of bis(3,4-dimethylbenzylidene) sorbitol (3,4-DMDBS) and dibenzylidene sorbitol (DBS). This blend is disclosed for use in a base resin processed at about 230 degrees C. through four heating zones, and then subjected to a molding temperature of 220 degrees C. See U.S. Pat. No. 6,586,007; column 1, lines 60-67. Results reported in the patent are shown graphically in FIG. 1 of the present application, as further discussed herein.

Japanese Patent Application Hei 6[1994]-93764 published Oct. 24, 1995 discusses a method of synthesizing the following species A, B, and C together in a single reaction system: Component A (asymetrical): 1,3-o-3,4-dimethylbenzylidene-2,4-o-benzylidene sorbitol and/or 1,3-o-benzylidene-2,4-0-3,4-dimethylbenzylidene sorbitol; Component B (symmetrical): bis(o-3,4-dimethylbenzylidene) sorbitol; and Component C (symmetrical): dibenzylidene sorbitol.

It would be highly desirable to develop a composition, process, or polymeric article manufacturing system that avoids many of these difficulties. There is a need to facilitate manufacture of low haze articles with reduced amounts of heat energy, and with reduced molding cycle times. A composition that is useful for application to high MFR resins also would be desirable, as high MFR resins are less viscous, and may be processed at lower temperatures. A product, composition, or process that provides increased article manufacturing output is desirable. It would be desirable to find a nucleating agent composition or mixture that provides a low degree of haze (i.e. high transparency) in a finished polymeric article, with less energy consumption and higher production efficiency.

BRIEF DESCRIPTION OF THE DRAWINGS

FIG. 1 shows a haze curve for a known blend of bis (3,4-dimethylbenzylidene) sorbitol (3,4-DMDBS) and dibenzylidene sorbitol (DBS), taken from data in Table 1 (comparative examples 16 and 17) of U.S. Pat. No. 6,586,007 to Lake et al (assigned to Milliken & Company). The shaded area between the data line and the straight line represents the beneficial effect of the combination at these condition(s).

FIG. 2 (discussed further below in connection with the invention) shows unexpected and superior results in one aspect of the invention using a blend of bis(3,4-dimethylbenzylidene) sorbitol (3,4-DMDBS) and dibenzylidene sorbitol (DBS). The shaded area between the dashed line and the curved line represents an unexpected and large amount of synergy observed in this blend combination, at the lower processing temperature and condition(s), using relatively high MFR resins.

CONVENTIONAL DBS/DMDBS BLEND PERFORMANCE

FIG. 1 shows the haze curve for a conventional published blend of bis(3,4-dimethylbenzylidene) sorbitol (3,4-DMDBS) and dibenzylidene sorbitol (DBS), taken from data in Table 1 (comparative examples 16 and 17) of U.S. Pat. No. 6,586,007 to Lake et al (assigned to Milliken & Company). The DMDBS and DBS taken together ("blend") were used in the resin at a total loading of about 2000 ppm at a molding temperature of about 220 degrees C. The resin used was a RCP (random copolymer) with 3% ethylene content. It is believed that the resin used in this published patent was about 12 MFR, which is a fairly viscous resin. A processing temperature of about 220 C. was used. In general, the more viscous resins (such as those at or below 20 MFR) must be heated a greater amount to make the resin flow adequately for manufacturing operations.

The area between the data line and the dashed line represents potential synergy in the use of the combination at this condition. The dashed line represents an expected (or "proportional") result that could be predicted based upon extrapolation of the data behavior of using each additive component alone, and connecting the result to approximate an expected haze value for the full range of blend combinations shown. The deviation in actual observed haze below the dashed line "expected" values represents the amount of synergy in the use of the combination, at the conditions under which the combination was employed. It may be noted that pure 100% DMDBS at 220 C has a relatively favorable haze value (see the data point on the right side of FIG. 1).

A relative "synergy factor" can be estimated by calculating the area of the shaded region in FIG. 1, expressed in units of Haze%*DMDBS%. In this instance, the relative synergy factor (actual calculated shaded area between the lines) is about 204 Haze%*DMDBS%. This "synergy factor" number 204 has no intrinsic meaning standing alone, but may be very useful in comparing the relative amount of synergy among different processes.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

Melt flow index (MFI), also known as melt flow rate (MFR), is a measure of viscosity of a material (such as a polyolefin resin) at a given temperature, expressed as grams/10 minutes. ASTM 1238-04 is an Internationally known standard for determining the rate of extrusion of molten resins through a die of specified length and diameter under prescribed conditions. ASTM D 1238-04 is hereby incorporated by reference for all purposes. In general, the lower the viscosity of a material at a given temperature, the higher will be the MFR of that material. High MFR values indicate low viscosity.

It is believed that 3,4-DMDBS has not been widely used in low temperature processing applications, such as polyolefin processes employing relatively high melt flow rate (MFR) resin. This may be because it is known that at relatively low processing temperatures, 3,4-DMDBS loses its ability to provide low and desirable levels of haze. Thus, there is a strong need in the industry to produce high quality polyolefin or polypropylene parts exhibiting low haze, using high MFR formulations. This invention addresses that need.

In the practice of the invention, an unexpected and relatively high amount of synergy has been discovered in the use of an additive blend composition at relatively low temperatures for polyolefins that employs both: (1) bis(3,4-dimethylbenzylidene) sorbitol (DMDBS) and (2) dibenzylidene sorbitol (DBS). This synergistic effect is especially useful and applicable when using high melt flow resins at relatively low processing or molding temperatures, such as below about 210 degrees C. In some applications, the invention may be employed for processing temperatures no greater than about 200 degrees C. In yet other applications, processing temperatures no greater than about 190 degrees C. are desirable. The resin ratio of bis(3,4-dimethylbenzylidene) sorbitol to dibenzylidene sorbitol may in some applications be between about 80:20 and 10:90.

Desirable and unexpectedly favorable haze values in molded plastic parts may be obtained using processing temperatures (compounding temperatures, and molding temperatures) much lower than previously known for this combination of nucleating agents. A lower processing temperature enables the use of less energy in the molding of plastic parts. Energy is required to bring the polymer up to the compounding and molding temperatures. A lower temperature leads to reduced energy costs, which can be significant in high volume manufacturing operations. One advantage of lower temperatures is that the cycle time (time required to mold one plastic part) may be reduced using lower temperatures. This enables the manufacture of a significantly greater number of parts per unit time.

A polyolefin comprising a blended DBS-containing additive composition is provided in one aspect of the invention comprising (a) a polypropylene resin, said polypropylene resin having an MFR value of at least about 20; (b) a first compound comprising bis(3,4-dimethylbenzylidene) sorbitol; and (c) a second compound comprising dibenzylidene sorbitol. The polypropylene (PP) resin may exhibit an MFR value of at least about 20, and in other instances at least about 30, or 40. In other applications, the MFR value of the PP resin may be about 50 or higher, depending upon the application.

A method for reducing haze in a polypropylene resin composition is possible in the practice of the invention. The method is directed to providing a polypropylene (PP) resin, and then combining the PP resin with a first compound comprising bis(3,4-dimethylbenzylidene) sorbitol and a second compound comprising dibenzylidene sorbitol, forming a nucleated resin. The nucleated resin is processed at a temperature no greater than about 210 degrees C. In other applications, the resin is processed at a temperature no greater than about 190 degrees C. The polypropylene resin may be visbroken from a lower MFR (i.e. 12 MFR) to an MFR value of at least about 30, in one aspect of the invention. Vis breaking is a process of controlled rheology or breaking the polymer chains in the polymer to raise the MFR value of a polyolefin resin. This chain breaking is typically accomplished with an organic peroxide during the melt compounding process. However, vis breaking is not always used to obtain high MFR resins, and may not be required. In some cases, for example a polypropylene (PP) resin providing an MFR of at least about 30 may be produced in the reactor.

Melt flow index (MFI), also known as melt flow rate (MFR), is a measure of viscosity of a material (such as a polyolefin resin) at a given temperature, expressed as grams/10 minutes. ASTM 1238-04 is an Internationally known standard for determining the rate of extrusion of molten resins through a die of specified length and diameter under prescribed conditions. ASTM D 1238-04 is hereby incorporated by reference for all purposes. In general, the lower the viscosity of a material at a given temperature, the higher will be the MFR of that material. High MFR values indicate low viscosity.

In one aspect of the invention, an additive composition is adapted for application to high melt flow rate polyolefins. The additive provides a combination of at least two nucleating agent compounds, bis(3,4-dimethylbenzylidene) sorbitol, and dibenzylidene sorbitol. The weight percentage of the bis(3,4-dimethylbenzylidene) sorbitol (DMDBS) is in the range of about 15 to about 60 percent of the total of the combined DMDBS/DBS total. Such a blend is particularly helpful and adapted for reducing haze in high melt flow rate polyolefins. The weight percentage of the first compound as a percentage of the total is greater than 25 percent and less than 50 percent, in one particular application being deployed.

Below is the structure of DBS (unsubstituted dibenzylidene sorbitol):

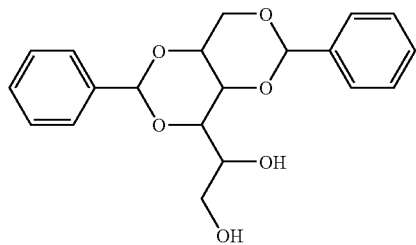

Below is DMDBS (also known as bis(3,4-dimethylbenzylidene) sorbitol:

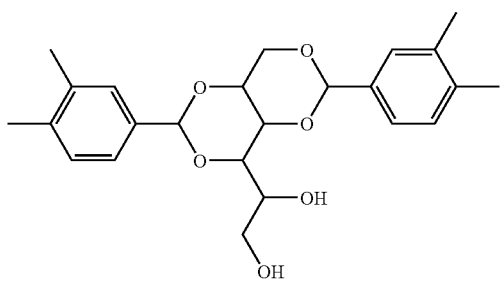

Blend Performance in the Invention

FIG. 2 shows unexpected and superior results in one aspect of the invention revealing a blend of 3,4-dimethylbenzylidene (3,4-DMDBS) and dibenzylidene sorbitol (DBS). Greatly reduced haze values, and previously unknown synergy, may be obtained.

This data shown in FIG. 2 and Table 3 was obtained when operating at relatively low processing temperatures (compounding temperature of about 190 degrees C. and molding temperature of about 190 degrees C.). The resin was visbroken to reduce viscosity, having a 50-60 MFR range, measured as grams/10 min. Blend loading was 1800 ppm. Thus, the resin was much less viscous than the resin used in the conventional process described above with respect to FIG. 1. This invention facilitates reduced cycle times and reduced energy consumption in the manufacture of products.

The amount of synergy observed is more significant, compared to prior art processes employing this blend. The area between the dashed line and the curved line represents the amount of synergy observed in this combination, at this processing temperature and condition(s). This "synergy" area is shaded in FIG. 2. The synergy level is most pronounced at 15-60 weight % DMDBS for the blend, and peaks at the lowest haze values, corresponding to 25-50 weight % DMDBS (as a percentage of the DMDBS/DBS total). This substantial haze improvement is unexpected and significant.

The synergy factor for the data reported in FIG. 2 was calculated as 806 Haze%*DMDBS%. This represents a calculated synergy about 4 times as much as the synergy calculated for the prior conventional process shown above in FIG. 1 (806 for this particular application of the invention, as compared to 204 for the prior conventional process of FIG. 1). This is a substantial, unexpected, and surprising result. This difference is believed to be due to the use of such blends in applications that employ lower temperatures for resin compounding and extrusion. This enables the use of a less viscous high MFR resin while still achieving superior haze characteristics.

Polyolefin Compositions

The term polyolefin or polyolefin resin is intended to encompass materials comprised of at least one polyolefin compound. Examples may include polypropylene, polyethylene, polybutylene, and any blends or copolymers thereof, whether high or low density in composition. However, the invention is most useful as applied in polypropylene.

The typical definition of a "high melt flow" polypropylene (PP) composition ("resin") is a PP resin having an MFR of greater than about 30. High MFR resins can be processed at relatively low temperatures. MFR values, for purposes of this published data, may be measured using the standard ASTM Test D1238 which is hereby incorporated by reference.

Crystallization Measurements in Polyolefin Resins

Crystallization is important to determine the time needed to form a solid article from molten polyolefin resins. The polymer crystallization temperature is measured using a differential scanning calorimeter (DSC). The sample (for example, a polypropylene control sample, or a nucleated polypropylene sample) may be heated from 60 degrees C. to 220 degrees C. at a rate of 20 degrees C. increase per minute to produce a molten formulation. Then the formulation may be held at 220 degrees C. for 2 minutes. At that time, the temperature is lowered at a rate of 20 degrees C. per minute until the sample reaches the starting temperature of 60 degrees C. The polymer crystallization temperature is measured as the peak maximum during the crystallization exotherm. The onset crystallization temperature of the polymer is the temperature at the beginning of the crystallization process, which may be calculated using DSC software. Haze measurements for samples analyzed herein were provided according to ASTM D1003-00 using a haze meter such as a BYK Gardner Haze Guard Plus on 2 inch×3 inch×0.05 inch plaques.

Nucleating agents affect the temperature at which crystallization occurs. DBS-type nucleating agents typically are most effective when they come out of solution and become insoluble in molten polymer at a temperature slightly above onset crystallization temperature. When small well-dispersed nucleating agent particles become insoluble in a molten polymer they provide nucleation sites for the polymer to crystallize as the polymer cools. The balancing of the relationship between nucleator composition and amount and processing conditions is important in achieving desired haze characteristics in a finished polymer article. This invention achieves a favorable balance between these factors.

Organoleptics

It is desirable that a polyolefin article not impart undesirable taste or odor (known as exhibiting "good organoleptics"). This feature is critical for use in many applications, particularly food contact applications. It is widely known in the industry that 3,4-DMDBS has very good organoleptic qualities. In blind taste tests, the inventive combination performed equivalent to the use of 3,4-DMDBS alone, in resins of various MFR, including vis-breaking resins.

Bis(o-4-methylbenzylidene) sorbitol (MDBS) is another commercial clarifier for polypropylene. It is not preferred in many applications, particularly food contact applications, because of its poor organoleptic property. Polypropylene parts containing MDBS transfer the undesirable odor to the food which is in contact with the polypropylene part. U.S. Pat. No. 5,049,605 to Rekers demonstrates that DMDBS is superior to MDBS in organoleptic properties. In blind taste tests, the current inventive combination performed superior to MDBS in organoleptics, in both a reactor grade polypropylene resin of 12 MFR and in a vis breaking polypropylene resin of about 50-60 MFR.

Processing Range

The ability to run a process at a broad range of conditions (such as temperature) is valuable in the polyolefin molding industry. This is known as a "broad processing window". This refers to the ability to perform a process over a large temperature range. Such a broad "window" enables ease of manufacturing and may lead to a more consistent finished product. The ability to manufacture a polyolefin article at comparatively low processing temperatures is desirable to reduce manufacturing cost.

The claimed invention facilitates a broader processing window. The total concentration of DBS and 3,4-DMDBS within the polyolefin formulation is equivalent to the typical concentration of 3,4-DMDBS within the polyolefin formulation when 3,4-DMDBS is used alone. The haze of various nucleating agent combinations, injection molded at 190° C., 210° C., and 230° C., respectively, are shown in Table 3 and Table 4. These measurements were obtained in a vis-broken 50-60 MFR polyolefin formulation prepared and compounded as detailed herein. Haze values at 190 degrees C. molding temperature in Table 3 was provided in FIG. 2, which is discussed herein.

Table 4 data indicates that an injection molding temperature of about 230° C., the haze measurements for both formulations decrease as total clarifier loading increases. At injection molding temperatures of about 210° C. the optimum haze values for containing 3,4-DMDBS as the only clarifier were obtained at a total clarifier loading of approximately 1600 ppm. In comparison, for samples containing a clarifier mixture comprised of a blend of DBS and 3,4-DMDBS the haze measurements decrease as total clarifier loading increases. This indicates that clarifier mixtures comprised of both DBS and 3,4-DMDBS facilitate a larger processing window as compared to 3,4-DMDBS alone. When injection molding is performed at 190° C., samples containing only 3,4-DMDBS show markedly increased haze values as the total clarifier concentration increases. In contrast, the mixture of 3,4-DMDBS/DBS reaches an optimum haze at a total concentration of approximately 1800 ppm and remains relatively constant up to levels of approximately 2200 ppm. This indicates that when injection molded at temperatures of about 190° C., the 3,4-DMDBS/ DBS blended mix exhibits much improved performance. In summary, blends of 3,4-DMDBS and DBS have a much wider processing window than 3,4-DMDBS alone, which is desirable.

Manufacturing

The claimed invention can be made in a manufacturing environment by physically blending the desired mixture, by weight, of DBS (MILLAD®3905) and 3,4-DMDBS (MILLAD ®3988), which are two separate products, that are prepared in separate reactions. Thus, the relative amount of one to the other may be varied to any degree desired, since they are added independently. Both compounds are commercially available as high purity powders, as well as masterbatch formulations, from Milliken & Company of Spartanburg, S.C. Both products allow for the component ratios to be tailored to suit the cost and clarity requirements for a given application.

EXAMPLES AND DATA

TABLE 1

Polypropylene Composition and Preparation Conditions for Haze and Tc Samples

| Component | Amount |
| --- | --- |
| Polypropylene random copolymer flakes (Spheripol, 12 MFR) | 1000 grams |
| Irganox ® 1010, primary antioxidant, available from Ciba | 500 ppm |
| Irgafos ® 168, secondary antioxidant, available from Ciba | 1000 ppm |
| Calcium stearate, acid scavenger | 800 ppm |
| Clarifying compounds or compositions | as noted |
| Lupersol 101 (vis-breaking agent available from Elf Atochem) | 500 ppm |

The base resin is a random copolymer ("RCP") with an MFR of approximately 12 g/10 min. The base resin and all additives (as indicated in Table 1) were weighed and then blended in a high intensity Henschel mixer for about one minute. Samples were then extruded using a Deltaplast 25 mm single screw extruder having an L/D ratio of 30:1. All zones on the extruder were set for 190° C.

The pelletized samples were molded into 2"×3"×0.05" plaques on an Arburg 40 ton injection molder, for the examples shown in Table 2. Plaque thickness was checked by a digital micrometer.

TABLE 2

Preparation of Inventive DBS Blends

| | 3,4-DMDBS (ppm) | DBS (ppm) |
| --- | --- | --- |
| Example Number | | |

TABLE 2-continued

Preparation of Inventive DBS Blends

|   | 3,4-DMDBS (ppm) | DBS (ppm) |
|---|---|---|
| 1 | 1600 | 200 |
| 2 | 1400 | 400 |
| 3 | 1200 | 600 |
| 4 | 1000 | 800 |
| 5 | 900 | 900 |
| 6 | 600 | 1200 |
| 7 | 300 | 1500 |
| Comparative Examples | | |
| 8 | 1800 | 0 |
| 9 | 0 | 1800 |
| 10 | 0 | 0 |

The plaques were tested for % Haze, and results are indicated in Table 3 and Table 4 herein, at the various molding temperatures indicated.

TABLE 3

Percent Haze Data at 1800 ppm Total Concentration versus Molding Temperature

| Example #/Molding Temperature (degrees C.) | % Haze (ASTM Standard Test Method D1003-00) |
|---|---|
| Example 1/190° C. | 42.6 |
| Example 1/210° C. | 9.8 |
| Example 1/230° C. | 9.8 |
| Example 2/190° C. | 38.3 |
| Example 2/210° C. | 10.4 |
| Example 2/230° C. | 10.6 |
| Example 3/190° C. | 29.8 |
| Example 3/210° C. | 11.0 |
| Example 3/230° C. | 11.5 |
| Example 4/190° C. | 19.6 |
| Example 4/210° C. | 11.6 |
| Example 4/230° C. | 12.5 |
| Example 5/190° C. | 15.2 |
| Example 5/210° C. | 11.9 |
| Example 5/230° C. | 12.6 |
| Example 6/190° C. | 11.2 |
| Example 6/210° C. | 12.1 |
| Example 6/230° C. | 12.7 |
| Example 7/190° C. | 12.6 |
| Example 7/210° C. | 13.8 |
| Example 7/230° C. | 14.4 |
| Comparative Examples Below | |
| Example 8/190° C. | 43.3 |
| Example 8/210° C. | 9.8 |
| Example 8/230° C. | 9.4 |
| Example 9/190° C. | 19.7 |
| Example 9/210° C. | 22.4 |
| Example 9/230° C. | 24.4 |
| Example 10/190° C. | 53.3 |
| Example 10/210° C. | 60.4 |
| Example 10/230° C. | 64.0 |

TABLE 4

Percent Haze vs Varying Loading Levels and Processing Temperatures

| Clarifier Composition (weight %) | Processing Temperature (degrees C.) | % Haze (ASTM Standard Test Method D1003-00) | Total Clarifier Loading (ppm) |
|---|---|---|---|
| 50% DBS/50% 3,4-DMDBS | 190 | 15.5 | 1500 |
| 50% DBS/50% 3,4-DMDBS | 210 | 13.9 | 1500 |
| 50% DBS/50% 3,4-DMDBS | 230 | 14.8 | 1500 |
| 50% DBS/50% 3,4-DMDBS | 190 | 13.9 | 1600 |
| 50% DBS/50% 3,4-DMDBS | 210 | 12.8 | 1600 |
| 50% DBS/50% 3,4-DMDBS | 230 | 13.8 | 1600 |
| 50% DBS/50% 3,4-DMDBS | 190 | 18.2 | 1800 |
| 50% DBS/50% 3,4-DMDBS | 210 | 11.4 | 1800 |
| 50% DBS/50% 3,4-DMDBS | 230 | 11.8 | 1800 |
| 50% DBS/50% 3,4-DMDBS | 190 | 18.3 | 2000 |
| 50% DBS/50% 3,4-DMDBS | 210 | 10.5 | 2000 |
| 50% DBS/50% 3,4-DMDBS | 230 | 11.0 | 2000 |
| 50% DBS/50% 3,4-DMDBS | 190 | 21.2 | 2200 |
| 50% DBS/50% 3,4-DMDBS | 210 | 10.0 | 2200 |
| 50% DBS/50% 3,4-DMDBS | 230 | 10.4 | 2200 |
| Comparative Examples Below | | | |
| 100% 3,4-DMDBS | 190 | 41.9 | 1500 |
| 100% 3,4-DMDBS | 210 | 10.8 | 1500 |
| 100% 3,4-DMDBS | 230 | 10.0 | 1500 |
| 100% 3,4-DMDBS | 190 | 43.9 | 1600 |
| 100% 3,4-DMDBS | 210 | 9.8 | 1600 |
| 100% 3,4-DMDBS | 230 | 9.9 | 1600 |
| 100% 3,4-DMDBS | 190 | 46.8 | 1800 |
| 100% 3,4-DMDBS | 210 | 13.4 | 1800 |
| 100% 3,4-DMDBS | 230 | 8.9 | 1800 |
| 100% 3,4-DMDBS | 190 | 48.9 | 2000 |
| 100% 3,4-DMDBS | 210 | 19.3 | 2000 |
| 100% 3,4-DMDBS | 230 | 8.6 | 2000 |
| 100% 3,4-DMDBS | 190 | 50.0 | 2200 |
| 100% 3,4-DMDBS | 210 | 23.1 | 2200 |
| 100% 3,4-DMDBS | 230 | 8.5 | 2200 |

The peak crystallization temperature (Tc) of inventive blends of the application, by example number, are shown in Table 5.

TABLE 5

Peak Tc of Inventive Blends

| Example Number | Peak Tc (° C.) |
|---|---|
| 1 | 116.1 |
| 2 | 115.8 |
| 3 | 115.5 |
| 4 | 115.1 |
| 5 | 115.1 |
| 6 | 114.6 |
| 7 | 114.0 |
| 8 | 116.3 |
| 9 | 112.3 |

It is understood by one of ordinary skill in the art that the present discussion is a description of exemplary embodiments only, and is not intended as limiting the broader aspects of the present invention.

The invention claimed is:

1. A polyolefin composition comprising:
    (a) a polypropylene resin, said polypropylene resin having an MFR value of at least about 20 as measured by ASTM 1238-04;
    (b) bis(3,4-dimethylbenzylidene) sorbitol; and
    (c) dibenzylidene sorbitol
    wherein the bis(3,4-dimethylbenzylidene) sorbitol comprises about 15 to about 60 percent of the combined total weight of bis(3,4-dimethylbenzylidene) sorbitol and dibenzylidene sorbitol contained in the polyolefin composition.

2. The polyolefin composition of claim 1 wherein said MFR value is at least about 30.

3. The polyolefin composition of claim 1 wherein said MFR value is at least about 50.

4. The polyolefin composition of claim 1 wherein the bis(3,4-dimethylbenzylidene) sorbitol comprises about 25 to about 50 percent of the combined total weight of bis(3,4-dimethylbenzylidene) sorbitol and dibenzylidene sorbitol contained in the polyolefin composition.

5. The polyolefin composition of claim 1 wherein the combined total weight of bis(3,4-dimethylbenzylidene) sorbitol and dibenzylidene sorbitol present in the polyolefin composition is about 1500 ppm to about 2200 ppm, based on the weight of the polypropylene resin.

6. A nucleated polypropylene resin consisting essentially of:
    (a) a polypropylene resin, said polypropylene resin having an MFR value of at least about 20 as measured by ASTM 1238-04;
    (b) bis(3,4-dimethylbenzylidene) sorbitol; and
    (c) dibenzylidene sorbitol
    wherein the bis(3,4-dimethylbenzylidene) sorbitol comprises about 15 to about 60 percent of the combined total weight of bis(3,4-dimethylbenzylidene) sorbitol and dibenzylidene sorbitol contained in the nucleated polypropylene resin.

7. The nucleated polypropylene resin of claim 6 wherein said MFR value is at least about 30.

8. The nucleated polypropylene resin of claim 6 wherein said MFR value is at least about 50.

9. The nucleated polypropylene resin of claim 6 wherein the bis(3,4-dimethylbenzylidene) sorbitol comprises about 25 to about 50 percent of the combined total weight of bis(3,4-dimethylbenzylidene) sorbitol and dibenzylidene sorbitol contained in the nucleated polypropylene resin.

10. The nucleated polypropylene resin of claim 6 wherein the combined total weight of bis(3,4-dimethylbenzylidene) sorbitol and dibenzylidene sorbitol present in the nucleated polypropylene resin is about 1500 to about 2200 ppm, based on the weight of the polypropylene resin.

11. A method for reducing haze in a polypropylene resin composition, said method comprising the steps of:
    (a) providing a polypropylene resin, said polypropylene resin having an MFR value of at least about 20 as measured by ASTM 1238-04;
    (b) combining with said polypropylene resin bis(3,4-dimethylbenzylidene) sorbitol and dibenzylidene sorbitol, thereby forming a nucleated polypropylene resin, wherein said bis(3,4-dimethylbenzylidene) sorbitol comprises about 15 to about 60 percent of the combined total weight of bis(3,4-dimethylbenzylidene) sorbitol and dibenzylidene sorbitol combined with said polypropylene resin;
    (c) forming by extrusion and/or injection molding said nucleated polypropylene resin composition into a plastic article at a temperature no greater than 190 degrees C.

12. The method of claim 11 wherein said MFR value is at least about 30.

13. The method of claim 11 wherein said MFR value is at least about 50.

14. The method of claim 11 wherein the bis(3,4-dimethylbenzylidene) sorbitol comprises about 25 to about 50 percent of the combined total weight of bis(3,4-dimethylbenzylidene) sorbitol and dibenzylidene sorbitol combined with said polypropylene resin.

15. The method of claim 11 wherein the combined total weight of bis(3,4-dimethylbenzylidene) sorbitol and dibenzylidene sorbitol combined with said polypropylene resin is about 1500 ppm to about 2200 ppm, based on the weight of the polypropylene resin.

* * * * *